(No Model.)
M. J. O'BRIEN.
DEVICE FOR JOINTING AND DRESSING THE TEETH OF SAWS.
No. 404,218. Patented May 28, 1889.
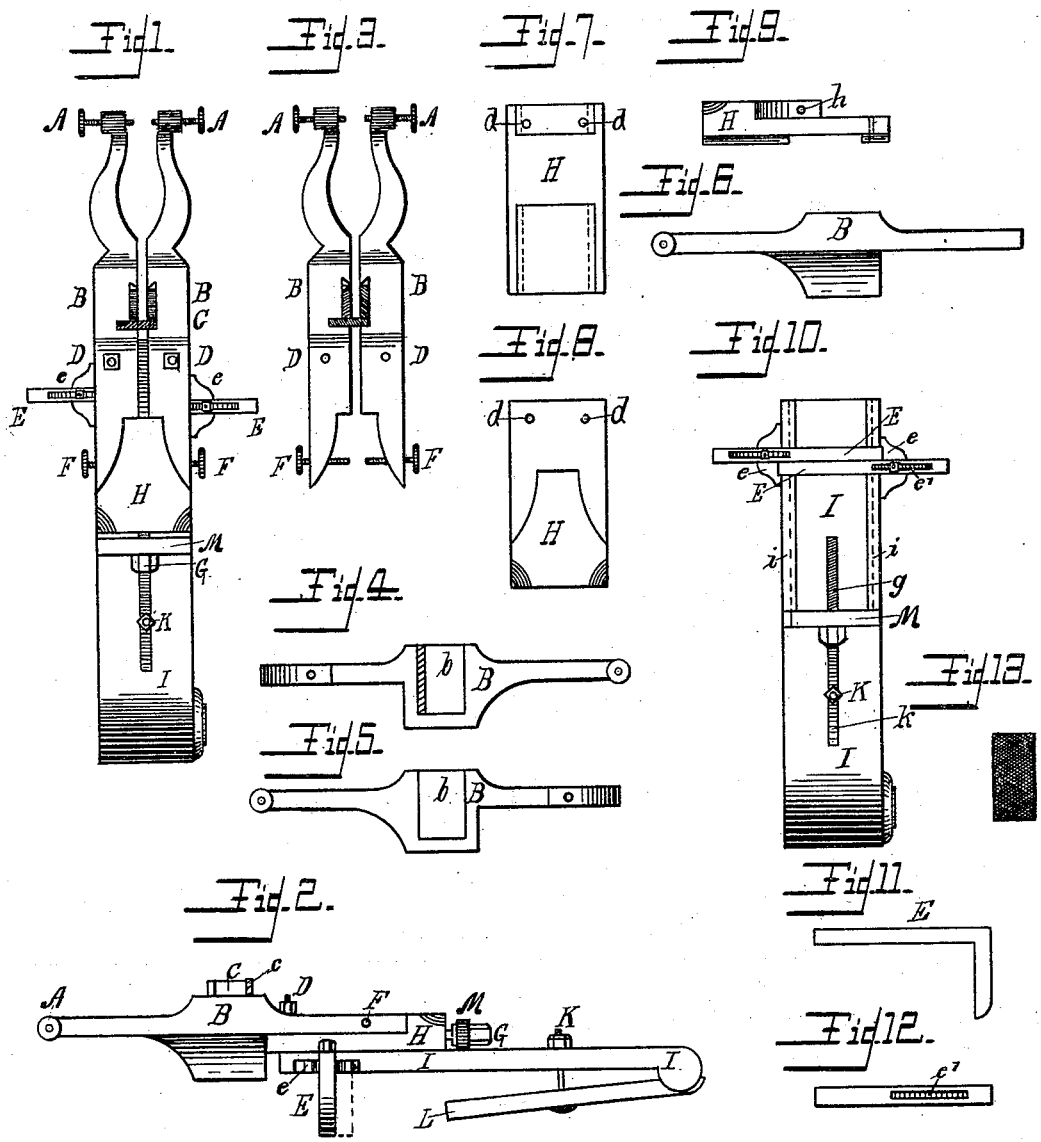
Witnesses:
C. S. Champions.
L. C. Hills.
Inventor:
M. J. O'Brien.
E. B. Stocking
Attorney.

UNITED STATES PATENT OFFICE.

MICHAEL JAMES O'BRIEN, OF DUSHORE, PENNSYLVANIA.

DEVICE FOR JOINTING AND DRESSING THE TEETH OF SAWS.

SPECIFICATION forming part of Letters Patent No. 404,218, dated May 28, 1889.

Application filed October 29, 1887. Serial No. 253,798. (No model.)

*To all whom it may concern:*

Be it known that I, MICHAEL JAMES O'BRIEN, of Dushore, in the county of Sullivan and State of Pennsylvania, have invented certain useful Improvements in Apparatus for Jointing and Gaging Saws, of which the following is a specification.

The object of my invention is to provide a saw-gager which shall be easily attachable to any part of the saw-frame, and which shall be adjustable to various-sized saws at will.

To this end my device is constructed and operated as described in the following specification, and its novel features are particularly set out in the claims appended thereto.

In the drawings, Figure 1 is a top view of my setter for saws. Fig. 2 is a side view of the same. Fig. 3 is a top view of the pivoted jaws detached from the remainder of the device. Figs. 4 and 5 are said jaws in side view, seen from between them, as shown in Fig. 1. Fig. 6 is an outer side view of one of said jaws. Fig. 7 is a bottom view of the jaw-support, showing the slides cut therein. Fig. 8 is a top view of the same, showing the curved adjustment bearing thereon. Fig. 9 is a side view of the same, showing the slides and adjustment bearing thereon. Fig. 10 is a top view of my device with the jaws and jaw-support removed, showing the adjustment of the steadying-arms and the undercut beveled guides for the slides under said jaw-support. Fig. 11 is a side view of one of the steadying-arms of my device. Fig. 12 is a top view of the same, showing the adjustment-slot. Fig. 13 is a face view of one of my detachable files.

In the drawings, I is the base of my device, which is adapted to be fastened to the frame of a saw by means of the pivoted jaw L, which is adapted to be closed by the screw-bolt and nut K.

The main use of my device is in jointing and gaging power-saws, both reciprocating and circular; but it may be used with any form of saw whatever. In the case of power-saws, then, this jaw will be clamped to an immovable part of the frame and the saw be allowed to work between the file-jaws, as further described.

The base I has a slot, *k*, cut through it, through which the bolt K projects, for the purpose of closing the jaw L, as described. The base is divided into two parts by the middle abutment, M, through which projects the screw *g*, which is operated by the nut G, having a neck projecting through said abutment, as shown in Fig. 2, for the purpose of acting positively upon said screw in both directions. The clamp is back of the abutment M, as shown in Figs. 1, 2, and 10. Forward of said abutment the base I is provided with undercut bevel-guides, *i*, for a purpose hereinafter described. Two ears, *e*, project from the sides of said base, through which project set-screws, also passing through slots E' in steadying-arms E, as shown in Fig. 10. These steadying-arms are shaped somewhat like a carpenter's square, as shown in Fig. 11, and are designed to clasp a portion of the saw-frame, for the purpose of supplementing the action of the clamp L in holding the device rigid against all movement. The slots and set-screws are for the purpose of adapting these arms to various portions of the frame which it may be desired that said arms should clasp. Sliding in said guides and controlled by said screw *g* is the jaw-support H, designed to be slid forward and backward at will by means of said screw. The two jaws B are pivoted to this support at D by screw-bolts extending through the holes *d* in said support. The rear ends of said jaws are curved to fit the adjustment-bearing H' of said support, and are provided with thumb-screws F, projecting through said jaws and into a hole, *h*, Fig. 9, in said bearing. The thumb-screws may either project through this hole, as shown in said figure of the drawings, or they may abut against each side of said bearing for the purpose of spreading the rear ends of said jaws and approaching the files in said jaws, as further described. At the forward ends of said jaws I provide two saw thumb-screws, which project through female screws in said ends, and are brought together against the two faces of the saw just back of the teeth, in order to confine its motion to the proper path and to keep it constantly in one plane.

A space somewhat wider than the thickness of the saw is left between the jaws just forward of the pivots, and on the inner faces of these jaws I provide recesses *b*, designed to receive the side files, C, which I key into place by means of the wedge-shaped keys c, Fig. 2. Extending across this space between the jaws, and from one recess to the other, is the transverse file C, Fig. 1, designed for shaping down the curved circumferential faces of the teeth of the saw.

It is evident that by bringing the ends of the thumb-screws F into contact the forward part of the jaws B may be brought together sufficiently to bring the side files into contact with the swaged teeth of a saw playing within the space between said jaws; or this motion of the jaws on their pivots may be accomplished by the abutting of said screws on said adjustment-bearing, as before described.

In order to bring the transverse file into proper contact with the saw, it is only necessary to thrust the jaw-support forward on its guides by means of the screw g.

It is evident that either plane or rounded files may be used in this device without departing from the spirit of my invention.

In the case of very thick saws it may be desirable to use the pivotal movement of the jaws alone without the saw thumb-screws for the purpose of the adjustment of the saw between said jaws in its movement, and at the same time and by the same movement the files for the sides of said saw would be brought into contact therewith.

What I claim is—

1. In a saw-jointer, the combination, with the base, of the jaw-support mounted at one side thereof, and the jaws provided with files pivoted at opposite sides of the support, substantially as specified.

2. In a saw-jointer, the combination, with the base, of the jaw-support adjustably mounted at one side thereof, and the oppositely-pivoted adjustable jaws mounted on the support and provided with files, substantially as specified.

3. In a saw-jointer, the oppositely-located saw-embracing jaws, provided with opposite recesses, as b, on their inner faces, and having the side files, C, set in said recesses, substantially as specified.

4. In a saw-jointer, the adjustable jaw-support recessed at its upper end, in combination with the oppositely-located file-carrying jaws provided with set-screws and mounted in said recesses, said screws terminating in bearings formed in the support, substantially as specified.

5. In a saw-jointer, the base provided with opposite grooves upon one of its faces, in combination with the jaw-support having tongues adapted to ride in said grooves, and the opposite saw-clamping file-carrying jaws pivoted to said support, substantially as specified.

6. In a saw-jointer, a base provided with opposite grooves and with an abutment in rear thereof, in combination with the jaw-support having tongues adapted to ride in the grooves, and the screw extending through the abutment and into the support and provided with a set-nut, substantially as specified.

7. In a saw-jointer, the saw-embracing jaw-support having opposite lugs provided with set-screws, in combination with the L-shaped clamping-arms mounted transversely on the support and slotted longitudinally to receive said screws, substantially as specified.

8. In a saw-jointer, the combination, with the jaw-support having a recessed outer end and provided with the opposite transverse openings, of the saw-clamping file-carrying jaws mounted in the recesses, bolts passing through the jaws and openings, the opposite saw-clamping set-screws mounted in the outer ends of the jaws, and similar set-screws mounted at their lower ends and bearing at opposite sides of the support, substantially as specified.

9. In a saw-jointer, the combination of the base I, slotted, as at k, with the clamping-arm L hinged thereto, and the set-screw K, projecting from the arm through the slot in the base, substantially as specified.

MICHAEL JAMES O'BRIEN.

Witnesses:
N. K. WOODWARD,
J. E. FINAN.